OR 3,832,029

United States
Bryngdahl

[11] 3,832,029
[45] Aug. 27, 1974

[54] SELF-IMAGING WITH AN OPTICAL TUNNEL FOR IMAGE FORMATION
[75] Inventor: Olof Bryngdahl, Cupertino, Calif.
[73] Assignee: Xerox Corporation, Stamford, Conn.
[22] Filed: Oct. 17, 1972
[21] Appl. No.: 298,205

[52] U.S. Cl.......................... 350/96 T, 350/162 SF
[51] Int. Cl...................... G02b 17/06, G02b 27/00
[58] Field of Search .................................. 350/96 T

[56] References Cited
UNITED STATES PATENTS
3,533,677  10/1970  Osterberg et al. ............. 350/168 X
3,680,943   8/1972  Ogden et al.................. 350/96 T X
3,721,965   3/1973  Morgan-Voyce.............. 350/96 T X FOREIGN PATENTS OR APPLICATIONS
1,149,238   4/1969  Great Britain .................... 350/96 T Primary Examiner—John K. Corbin

[57] ABSTRACT

The present invention relates to the formation of images by self-imaging through the use of an optical tunnel. An optical tunnel is provided which has dimensions defined so as to satisfy a criterion for the production of self-imaging of an object located along its optical axis. The object in the preferred embodiment is located in an object plane at one end of the optical tunnel and is illuminated by means of a monochromatic light source. In the object plane, outside of the optically denser medium within the tunnel, virtual images are formed which act as virtual objects from which a self-image of the object is formed at the other end of the optical tunnel.

18 Claims, 2 Drawing Figures

SELF-IMAGING WITH AN OPTICAL TUNNEL FOR IMAGE FORMATION

BACKGROUND

This invention relates to a method and apparatus for forming images of a single object, and more particularly to image formation through self-imaging with an optical tunnel.

An optical image is the reproduction of an object formed by an optical system. An illuminated object is considered to be composed of an infinite number of adjacent points of light, each of which emits secondary radiation. Conventional optical systems employ a lens to convert the diverging radiation into a converging beam which intersects to form an image of the original object point. Other techniques usually employed would be dependent on interference techniques such as diffraction or self-imaging.

Image production by diffraction techniques would include the use of a galvanometer mirror, an astronomical telescope, or even photographic lenses. Another diffraction technique, without the need of a lens, would be the coherent illumination of a two-dimensional periodic array of objects by monochromatic light. In such instance, the illumination falling on the plurality of objects is diffracted and a like plurality of images are formed in a diffraction field at certain defined planes at a distance from the array of objects. This diffraction scheme may also be referred to as self-imaging because of the formation of images through the interference of reflected radiation from the array of objects.

Self-imaging of periodic objects in coherent light is a well-known phenomenon. Illumination of an object repeated in two orthogonal directions, with a period $d$, by collimated light of a wavelength $\lambda$ results in Fourier images of the periodic object in planes at distances $z = 2\nu d^2/\lambda$ from the object, where $\nu$ = an integer. If the object array is illuminated with a point source located at a distance $z_o$ in front of the object, the planes with the Fourier images are given by $1/z_o + 1/z = \lambda/(2\nu d^2)$ for a square array and $1/z_o + 1/z = 2\lambda/(3\nu d^2)$ for a hexagonal array. Between the planes so defined, Fresnel images are formed which are not true images of the object. The locations of these planes are obtained by replacing $\nu$ in the formula above with $\nu + N/n$, where $n$ and $N$ are integers with no common factor.

These arrangements, through, require either a complexity of apparatus and techniques for a plurality of periodic object to achieve images of an original object. Moreover, prior art self-imaging techniques are limited to illuminating a periodic object with coherent radiation for the formation of a plurality of images of the object at certain distances away from the object array.

It is thus an object of the present invention to provide a self-imaging method and apparatus for forming identical images of a single object in a simplified manner.

It is the further object of the present invention to form self-images of a symmetrical object through the use of an optical tunnel.

It is yet another object of the present invention to form identical images of a single object solely through the use of an optical tunnel by illuminating the object with either spatially coherent or incoherent, monochromatic light.

It is still another object of the present invention to provide a sharpened self-image of a single object illuminated by monochromatic light solely by using an optical tunnel of predetermined dimensions.

Other objects of the invention will be evident by the description hereinafter presented.

SUMMARY OF THE INVENTION

The invention provides a monochromatic light source to illuminate a single object so that individual points of the object may serve as sources to achieve self-images of the object resulting from the formation of virtual objects within the object plane through the use of an optical tunnel. The optical tunnel is structured in accordance with predetermined dimensions devised to produce self-images of the object in defined planes at predetermined distances from the object.

A feature of the invention is that Fourier images are formed at certain of the planes, one of which is located at the end of the optical tunnel opposite from the location of the object. If spatially incoherent, monochromatic illumination of the object is provided, Fresnel images are formed in planes between the Fourier image planes. The Fresnel images, which in each plane consist of a plurality of self-images of the object, may be utilized instead of the Fourier image of the object if a multiplicity of images of the object is desired. Since the Fresnel images formed are true images of the object, they may be optically utilized in communications or other applications.

It is still another feature of the invention that the optical tunnel be an equilateral parallelepiped and that the object by symmetrical for the production of self-images. In accordance with this invention, self-images of an unsymmetrical object may still be provided by illuminating two identical objects side by side or, alternatively, by duplicating the object through the use of a mirror so that a symmetrical object is provided for transmitting a symmetrical pattern of reflected light through the tunnel.

Yet another feature of the invention provides for the formation of self-images of a symmetrical object through the use of an optical tunnel which may be cylindrical in shape. If the object has a radial periodicity, such as would a circular grating, the Fourier images or Fresnel images would still be formed in their respective planes.

These and other features which are considered to be characteristic of this invention are set forth with particularity in the apended claims. The invention itself, however, as well as additional objects and advantages thereof, will best be understood from the following description when considered in conjunction with the accompanying drawings.

DESCRIPTION OF THE PREFERRED EMBODIMENT

Figure 1:
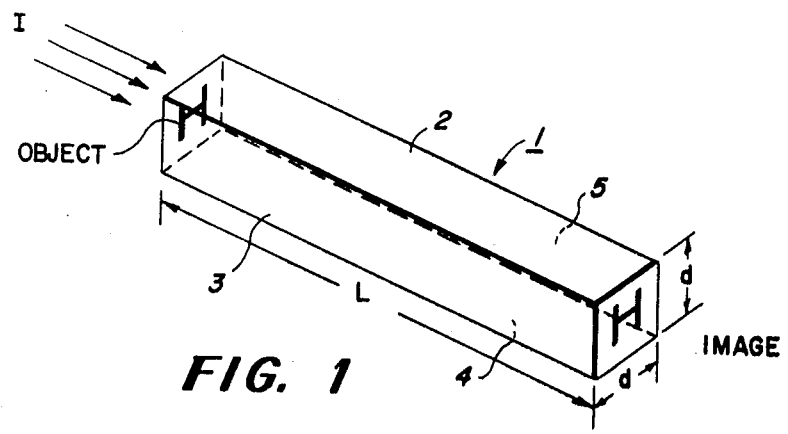
FIG. 1 is a schematic drawing of a self-imaging system which embodies features of the invention.

In FIG. 1 is shown a self-imaging system in accordance with the invention. An object H is located at one end of an optical tunnel or waveguide 1. The tunnel 1 is an equilateral rectangular parallepiped with sides 2–5 at 90° from one another. The sides 2–5 are made of glass. The length of the optical tunnel 1 is L, whereas the width of the sides 2–5 is given by $d$. Monochromatic illumination I of the object H will produce a self-image of the object at the opposite end of the tunnel 1. The object H may be illuminated by any number of optical convolutions which produce monochromatic light.

For example, a laser may be used to produce coherent, monochromatic light, or if combined with a rotating ground glass may produce incoherent, monochromatic light. An alternate light source would be a mercury arc lamp which would radiate an incoherent, monochromatic light. Of course, if collimated, the radiation from the arc lamp could be rendered coherent. Still another source would be the illumination of the object H by natural light in combination with suitable filtering to provide incoherent, monochromatic illumination.

The self-images produced by the optical system of FIG. 1 may be of two types which have been given definition in the background portion of this application. If coherent, monochromatic illumination is provided, only Fourier image planes may be produced. In such embodiment, only a single self-image of the object H would be produced in a given image plane. To insure that a self-image of the object H is provided at the opposite end of the tunnel 1, the length L of the tunnel 1 is defined as $n(2d^2/\lambda)$, where n is an integer. For example, if $d = 0.5$ mm and $\lambda = 6328$ A., then L $= 400$ mm. Of course, if the object H is moved away from its respective end of the tunnel 1, the Fourier image planes would move accordingly away from their original positions.

If incoherent, monochromatic light were used as the illumination I for the object H, then both Fourier and Fresnel image planes are formed at respective locations. The Fresnel image planes would be located between the Fourier planes at locations identified by replacing $n$ in the calculations above with $n + V/v$, where $v$ and $V$ are integers with no common factor. If it is desired that the Fresnel image planes be located at the end of the tunnel 1 opposite from the object H, the index of refraction of the medium within the tunnel 1 or the physical dimensioning of the tunnel 1 may be accordingly modified.

For example, a length L of the tunnel 1 would be provided by the formula $(n+V/v)2d^2/\lambda$ in order to provide for this condition. The Fresnel image plane may also be insured at the opposite end of the tunnel 1 by simply changing the wavelength $\lambda$ by filling the tunnel 1 with a liquid which is held in place by capillary forces, thus varying the index of refraction of the medium within the tunnel 1, without any need to alter the physical dimensioning of the tunnel 1, itself. Another approach would employ a sealed optical tunnel 1 with glass end faces which could provide for a gas-filled tunnel 1. In such case, one could simply vary the pressure of the gas, thus varying the index of refraction, in order to locate either Fourier or Fresnel image planes at the end of the tunnel 1 opposite from object H.

The Fresnel image planes contain multiple, true images of the single object H which may be used in communications and other applications. The unit cell in the Fresnel image plane has been found to be reduced by a factor $m$ compared to that of the Fourier images. Thus, in the Fresnel image plane, there exists a multiplicity $m$ of the original object.

For the production of self-images through the use of the optical tunnel 1, the sides 2–5 need only have interior walls which are reflective of the irradiance from the object H. If the object H is proximate to or at one end of the tunnel 1, then the radiation from the object H is nearly all irradiated into the tunnel 1. Since the volume defined by the tunnel 1 is optically denser than the medium outside of the tunnel 1, nearly all of the radiation is totally reflected toward the other end of the tunnel 1. Thus, the sides 2–5 may consist of any material with a mirrored surface internal to the tunnel 1. Also, a solid, translucent material may comprise the optical tunnel or waveguide 1. Further more, the tunnel 1 may be any equilateral parallelepiped or be in fact cylindrical in shape, provided that the object is of radial periodicity. One such object would be a circular grating.

In the preferred embodiment, the object is one that is symmetrical in nature, as the letter H. In accordance with this invention, the effective object must be symmetrical for the production of the self-images. Unsymmetrical objects may still be effectively used in conjunction with the teaching of this invention provided that two, identical, unsymmetrical objects are illuminated side by side or that, alternatively, the object is duplicated through the use of a mirror to provide the necessary symmetrical object for transmitting a symmetrical pattern of reflected light through the tunnel 1.

Figure 2:
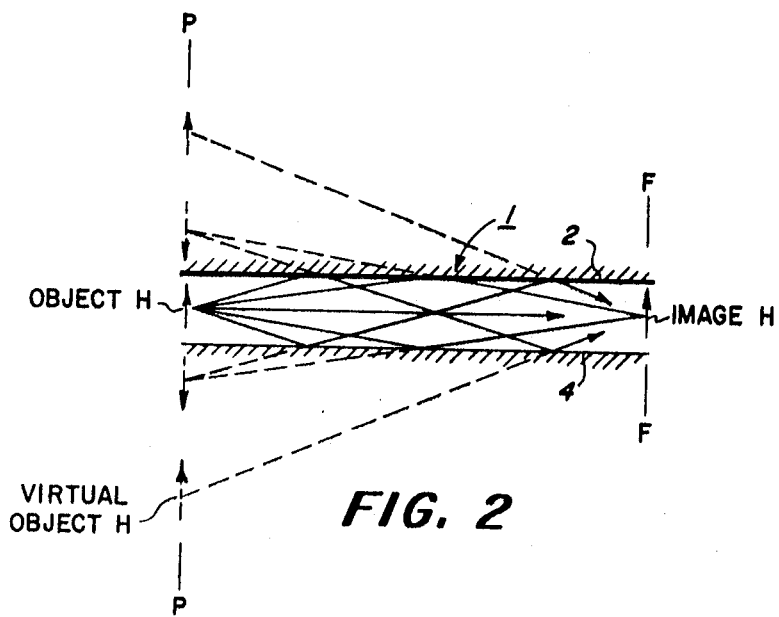
FIG. 2 is a cut-away view of the optical tunnel shown in FIG. 1 giving an idealized irradiance distribution to form the self-imaging of the object.

In FIG. 2 is shown a cut-away view of the optical system of FIG. 1. The formation of the image H at the end of the tunnel 1 opposite from the object H is shown to be dependent upon the virtual images of the object H, which form a plurality of virtual objects H in the object plane P. Consistent with the theory of self-imaging, an interference pattern results from the combination of the irradiance from the object H and the existence of the virtual objects H to form the self-image H shown in the Fourier image plane F.

The resolution of the self-images formed by the optical system in accordance with this invention is of extremely good quality, obviating the need of any lens-type system. In the case of an application involving integrated optics, namely by using an optical fiber or waveguide as the tunnel 1, the resolution of the final image may be assured to be of good quality by dimensioning the fiber so that a sufficient number of modes are propagated through the fiber. The resolution of the final image is increased by increasing the number of modes and thereby the number of virtual objects. This result is consistent with the generalized concept of self-imaging which provides for higher resolution by increasing the number of objects in a periodic array. In this sense, the invention provides a significant optical instrument for utilization in image processing and communications applications. It is worthy to note that the prior art use of optical fibers without the benefit of the teachings of the present invention requires the bundling of a plurality of fibers for any image production With the present invention, images of an object may be produced with a single fiber.

The invention also provides a powerful optical tool to create multiple images of any object. A single object, when illuminated in conjunction with the use of an optical tunnel 1, can have corresponding multiple, identical images of the object in a Fresnel image plane. Another significant advantage is that extremely sharp images are created, both in the Fourier and Fresnel image planes. Thus, no additional optical apparatus, such as lenses, are necessary for providing usable optical images of an object.

Obviously, many modifications of the present invention are possible in light of the above teaching. For example, an optical tunnel may be used in accordance with this invention which is a composite of a solid glass structure constituting one portion and an air and glass structure constituting the other portion of the tunnel. It is therefore to be understood that, in the scope of the appended claims, the invention may be practiced other than as specifically described. What is claimed is:

1. An optical system for the formation of images of a symmetrical object comprising means for providing a monochromatic irradiance from the object and optical tunnel means responsive to the irradiance from said object for transmitting said irradiance such that identical images of said object are formed at predetermined distances from said object with said tunnel means dimensioned according to the relationship
$L = n(2d^2/\lambda)$,
where L is its length, $d$ is the width, $\lambda$ is the wavelength of the irradiance within said tunnel means, and $n$ is an integer.

2. The system as claimed in claim 1 wherein said irradiance means provides a coherent irradiance such that Fourier images of said object are formed, each of which are in respective image planes at predetermined distances from said object.

3. The system as claimed in claim 2 wherein said object is positioned in axial alignment with said tunnel means and proximate to one end of said tunnel means such that a Fourier image of said object is formed at the other end of said tunnel means.

4. The system as claimed in claim 1 wherein said tunnel means is an equilateral parallelepiped having a length greater than its width and sides with reflective internal surfaces.

5. The system as claimed in claim 4 wherein said tunnel means is a rectangular equilateral parallelepiped with its sides at right angles with one another.

6. The system as claimed in claim 1 wherein said irradiance means provides an incoherent irradiance such that Fourier and Fresnel images of said object are formed, each of said Fourier images are in respective image planes at predetermined distances from said object and said Fresnel images are formed in certain other image planes at predetermined distances from said object.

7. The system as claimed in claim 6 wherein said Fresnel images are optically true images of said object and multiple images of said object are formed in each of said Fresnel image planes.

8. The system as claimed in claim 7 wherein said object is positioned in axial alignment with said tunnel means and proximate to one end of said tunnel means such that a Fourier image of said object is formed at the other end of said tunnel means.

9. An optical system for the formation of images of a symmetrical object comprising means for providing a monochromatic irradiance from the object and optical tunnel means responsive to the irradiance from said object for transmitting said irradiance such that identical images of said object are formed at predetermined distances from said object with said tunnel means dimensioned according to the relationship
$L = (n+V/v) \, 2d^2/\lambda$
where L is its length, $d$ is the width, $\lambda$ is the wavelength of the irradiance within said tunnel means, and $n$, $v$, and $V$ are integers with no common factor.

10. The system as claimed in claim 9 wherein said object is positioned in axial alignment with said tunnel means such that Fresnel images of said object is formed at the other end of said tunnel means.

11. An optical system for the formation of images of an object comprising means for providing a monochromatic irradiance from the object and optical tunnel means responsive to the irradiance from said object for transmitting said irradiance and forming identical images of said object at predetermined distances from said object, said tunnel means being dimensioned according to the relationship $L = n(2d^2/\lambda)$, where L is its length, $d$ is the width, $\lambda$ is the wavelength of the irradiance within said tunnel means, and $n$ is an integer.

12. The system as claimed in claim 11 wherein said tunnel means has mirrored, internal surfaces symmetrical about the optical axis of said tunnel.

13. The system as claimed in claim 12 wherein said tunnel means is a parallelepiped.

14. The system as claimed in claim 13 wherein said irradiance means provides a coherent irradiance such that Fourier images of said object are formed, each of which are in respective image planes at predetermined distances from said object.

15. A method of forming images of an object comprising the steps of illuminating the object with monochromatic radiation such that individual points of the object are sources of secondary radiation, providing an optical tunnel means dimensioned according to the relationship $L = n(2d^2/\lambda)$, where $L$ is its length, $d$ is the width, $\lambda$ is the wavelength of the irradiance within said tunnel means, and n is an integer, positioning said tunnel means in optical alignment with said object such that virtual images of said object are formed in the object plane, and transmitting said secondary radiation throughout the length of said tunnel means such that said tunnel means forms identical images of said object at predetermined distances from said object.

16. The method as claimed in claim 15 wherein said object is illuminated with coherent, monochromatic radiation such that Fourier images of said object are formed, each of which are in respective image planes at predetermined distances from said object.

17. The method as claimed in claim 15 wherein said object is illuminated with incoherent, monochromatic radiation such that Fourier and Fresnel images of said object are formed, each of said Fourier images are in respective image planes at predetermined distances from said object and said Fresnel images are formed in certain other image planes at predetermined distances from said object.

18. The method as claimed in claim 17 wherein said Fresnel images are optically true images of said object and multiple images of said object are formed in each of said Fresnel image planes.

* * * * *